United States Patent [19]

Beck

[11] Patent Number: 4,900,077
[45] Date of Patent: Feb. 13, 1990

[54] DOG LITTER CLEANUP DEVICE

[76] Inventor: Warren R. Beck, 1567 Atlantic St., St. Paul, Minn. 55106

[21] Appl. No.: 250,533

[22] Filed: Sep. 29, 1988

[51] Int. Cl.$^4$ ............................................. A01K 29/00
[52] U.S. Cl. ..................................... 294/1.3; 248/100
[58] Field of Search ................................... 294/1.3–1.5, 294/33, 55, 99.2, 100; 15/104.8, 257.1, 257.4, 257.7; 248/95, 99–101; 383/6, 12, 13, 22; 119/1, 96

[56] References Cited

U.S. PATENT DOCUMENTS

| | | | |
|---|---|---|---|
| 3,819,220 | 6/1974 | Bredt | 294/1.5 |
| 4,010,970 | 3/1977 | Campbell | 294/1.5 |
| 4,146,260 | 3/1979 | Carrington | 294/1.5 |
| 4,159,139 | 6/1979 | Gawedzinski | 294/55 |
| 4,185,861 | 1/1980 | Berner | 294/1.5 |
| 4,335,678 | 6/1982 | Garza et al. | 294/1.5 |
| 4,466,647 | 8/1984 | Spevak | 294/1.5 |
| 4,717,186 | 1/1988 | Yoshioka | 294/1.5 |

FOREIGN PATENT DOCUMENTS

| | | | |
|---|---|---|---|
| 2512203 | 9/1976 | Fed. Rep. of Germany | 294/1.3 |
| 3225602 | 1/1984 | Fed. Rep. of Germany | 294/1.3 |

*Primary Examiner*—Johnny D. Cherry

[57] ABSTRACT

A device, storable in a pocket or purse, containing two extendable arms, attached to each other at one end, which spread apart when extended due to spring action. In this extended position the arm tips and apex, each having a nubble, are in triangular arrangement so that a disposable bag can be stretchably attached over the nubbles at these three points, thus covering the fork arms and protecting them from soiling. In this method the bag is used as a receptacle for dog feces which is pushed into it with a small stick or other disposable material. After use the arms are pushed back into the handle of the device so that it can be discreetly stored.

9 Claims, 2 Drawing Sheets

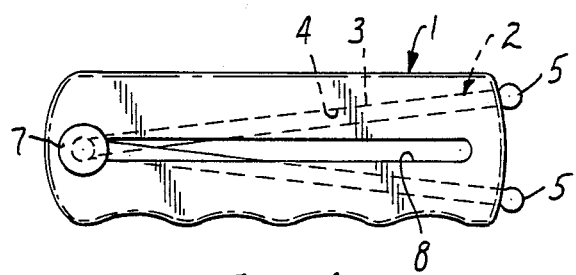
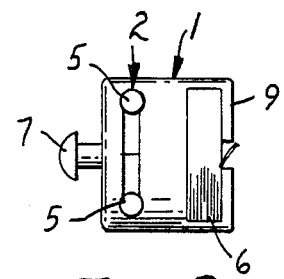
Fig. 1  Fig. 2
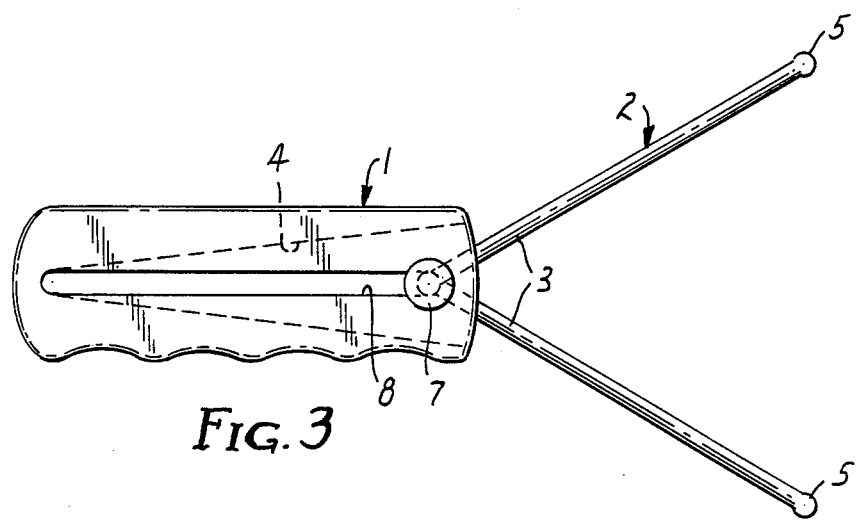
Fig. 3
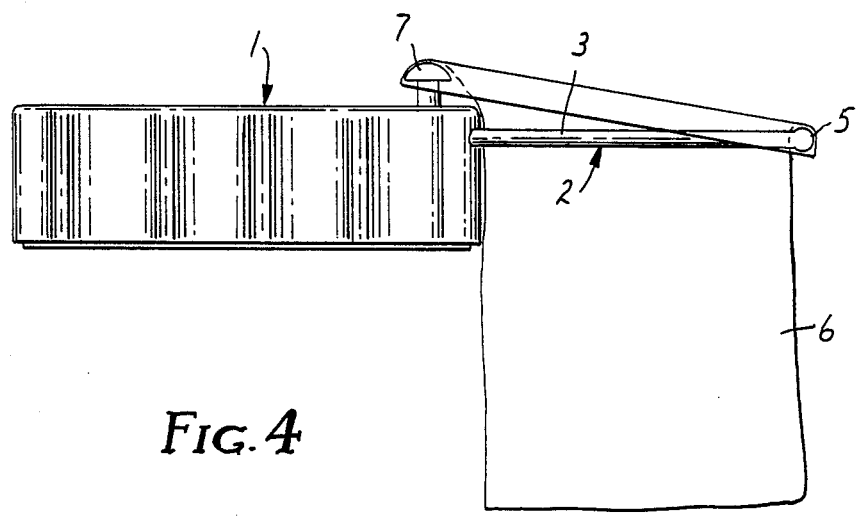
Fig. 4

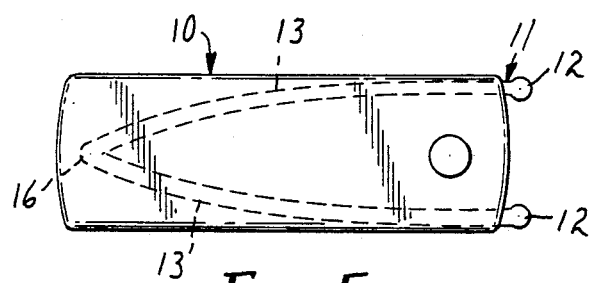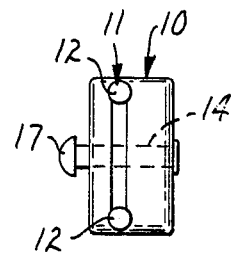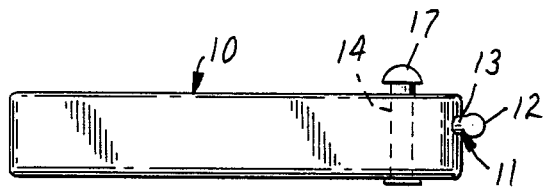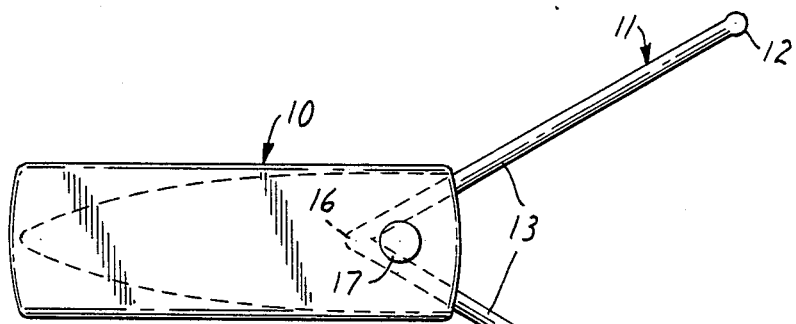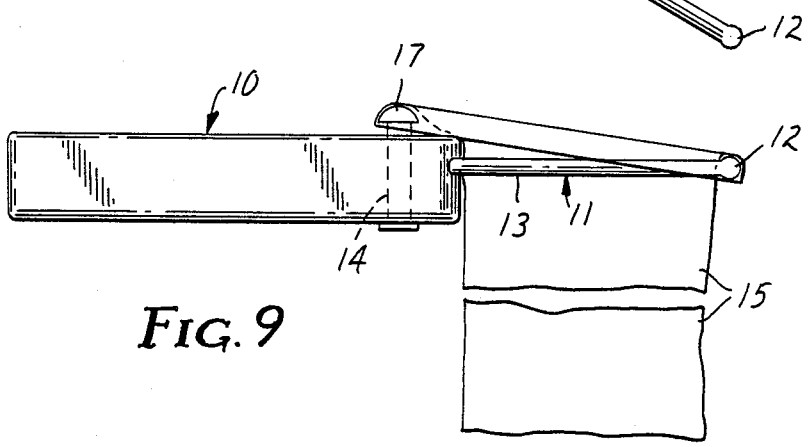

DOG LITTER CLEANUP DEVICE

BACKGROUND ART

In many cities and parks, and elsewhere, the law and/or the need for cleanliness, requires that one clean up his own dog's litter. This need has resulted in the proliferation of devices for the cleanup of litter. Most of these devices are in the form of scoops or shovels. One device is a set of tongs about a foot long. The tong end is like an excavating scoop, and its two cups come together to form a 3×3 inch box in which the litter is picked up and contained until disposed of. But this device is awkward to carry and would need cleaning after use. This device, like all the others I have seen, suffers one or more of the following drawbacks: awkwardness, lack of cleanliness, and unattractiveness.

There are many patents, most of them of recent origin, which are directed toward the cleanup of dog litter. These patents are found in classification 294, subclasses 1.3, 1.4, and 1.5. Though I found none which I felt to be very pertinent, I cite the following ones as being of interest:

U.S. Pat. No. 4,021,994, "Scoop Device" to Peggy Mainprice, describes a closed wire frame attached to a folding handle. The device does not us a "Y" fork, as does mine, and the fork is not retractable.

U.S. Pat. No. 4,191,414, "Sanitary Device", to James Dameron, uses a plastic bag affixed to a rigid, triangular wire frame by means of a bight at the apex. The frame has an attached handle and the assembly is used as a scoop. The device cannot be retracted and is cumbersome and unsightly.

U.S. Pat. No. 4,323,272, "Excrement Pickup Device", to J. Paul Fortier, is designed to enable the user to pick up droppings using only one hand while the other hand holds the dog leash. The device uses a plastic bag and acts as a rigid tongs/scoop, entrapping the droppings.

U.S. Pat. No. 4,341,410, "Supporting Frame For Detachable Holding A Bag Type Receptacle", to Harley R. W. Summach, uses a wire frame with a triangular opening to support a plastic or paper bag in the open position. The patent states that the primary use for the invention is as a scoop for scooping up dog droppings and the like. It is foldable for easy storage.

U.S. Pat. No. 4,466,647 "Animal Feces Disposal Device", to Sidney M. Spevak, discloses the use of a telescoping wand having a pair of spring arms at the working end, which arms have clips thereon for releasably holding a plastic bag.

DISCLOSURE OF INVENTION

From the above descriptions and from observation of the available commercial devices, it can be seen that the most serious deficiencies of the prior art for cleanup of dog litter are: (1) they are cumbersome and inconvenient to carry around, (2) they become soiled with dog feces upon use and must be cleaned, and (3) they appear as obvious dog litter cleanup tools and are thus aesthetically unpleasing. My design eliminates all three of the above deficiencies.

Most prior art devices are large and cumbersome, whereas my device is only about 3 to 6 inches in length unextended, and can be carried in a pocket or purse, or it can be entirely contained in the handle of a leash. When used as a leash handle it can be reversed so that the operation of the litter cleanup device will not interfere with the use of the leash.

My device is not an obvious litter cleanup tool. The fork can be hidden by retracting it into the handle. It is thus discreet and attractive whether it is pocketed or used as the leash handle.

My device is very sanitary to use. The design results in only the litter bag and a spatula, twig, leaf or paper becoming soiled, and these are quickly disposed of. After the bag has been used and detached, the clean fork can quickly be retracted into the handle. All parts that have come into contact with feces are thrown away.

The invention disclosed in this patent application overcomes all of the aforementioned deficiencies and thereby is superior to any prior art. These deficiencies, to repeat, are: (1) lack of cleanliness, (2) cumbersome to carry and use, and (3) not aesthetically pleasing.

I have above described my invention, and it is believed that my design will be very utilitarian and desirable. The various features of novelty which characterize it are pointed out with particularity in the claims annexed to and forming part of this specification. For a better understanding of the invention, its operation, advantages, and specific objects attained by its use, reference is made to the accompanying drawings and descriptive matter in which there is illustrated the essential features.

DESCRIPTION OF THE DRAWINGS

By means of the attached figures I will try to describe my invention in more detail.

FIG. 1 is a plan view of the handle of the invention in the closed position;

FIG. 2 is an end view thereof as seen from the right end of FIG. 1;

FIG. 3 is a plan view of the handle of the invention in the extended or working position;

FIG. 4 is a side view of FIG. 3 having a bag attached thereto;

FIG. 5 is a plan view of an alternate handle in the closed position;

FIG. 6 is an end view thereof as seen from the right of FIG. 5;

FIG. 7 is a side view of FIG. 5 in the closed position;

FIG. 8 is a plan view of the handle of FIG. 5 showing the fork extended and;

FIG. 9 is a side view of FIG. 8 having a bag attached thereto.

DETAILED DESCRIPTION

FIGS. 1 through 4 illustrate one version of my invention showing a steel wire fork (2) and a plastic handle (1). FIG. 1 shows the fork in the retracted position. FIG. 2 is an end view of the same. In the retracted position the two-fork prongs (3) are confined within the handle and are held nearly together by the design of the opening (4) in the end of the handle. When the fork is pushed out to the extended "ready-to-use" position them apart so that the fork tips and apex form a triangle (FIG. 3). The fork prongs may be metal or plastic and formed so as to assume the open position when at rest and to require pressure to be moved to the closed position of FIG. 1. Each of the tips and the apex has a small nubble (5 and 7) or bend so that the open end of a small bag (6) may be stretched over said nubbles and held in place by the tension. Nubbles, in this case, are protuberances over which the bag can be stretchably attached.

Just enough tension is supplied to hold the bag (6) open while pushing the litter into it with a spatula, stick, leaves, or the like. The nubble (7) at the apex, if rigidly attached to the fork, may also provide the means for pushing the fork into or out of the handle. The shaft of nubble 7 slides in a slot 8 in the handle 1.

FIG. 4 shows the disposable bag (6) attached to the device. After use the bag and contents are discarded and the fork is slid back into the handle.

Another version of my invention is shown in FIGS. 5 through 9. This version is comprised of a plastic box-like handle (10) and a plastic fork (11). FIG. 5 shows the fork (11) in the retracted position in the handle (10), with nubbles (12) at the tips of the fork prongs (13). FIGS. 6 and 8 are the end and side views, respectively, of FIG. 5. FIGS. 8 and 9 are the top and side views, respectively, showing the fork (11) in the extended position. When in the extended position the apex (16) of the fork (11) rests against a post (14) which supports the third nubble (17), the other two being at the fork tips. FIG. 9 shows a plastic bag (15) attached to the three nubbles of the device when in the extended position ready for use.

In FIGS. 5 through 9 the plastic box-like handle is made of high density polyethylene, and the fork is made of 3/16 inch diameter Polypenco Nylon rod. The nubble (17) is attached to the handle instead of the fork and is held in place on the end of a post (14). The post (14) also serves as a stop to keep the fork in the proper position when extended. The fork is extended or retracted by manually pushing it into or pulling it out of the handle. Its operation in use is the same as described above for FIGS. 1 through 4.

The two primary components of my invention are the fork and the handle. The fork may be formed of any springy flexible rod or wire material with the right degree of stiffness. The fork should be stiff enough to hold the bag open firmly, yet not so stiff as to tear or overstretch the thin plastic bags which are used.

The handle may be made of plastic, leather, wood, metal, or combinations of these. The apex nubble may be part of the handle instead of part of the fork apex. It is believed that this modification would simplify the manufacture of the device.

Some of my designs incorporate a pocket to hold a supply of bags in folded or roll form so as to be easily extracted when needed. As illustrated in FIG. 2, a pocket or container 9 may be placed on one side of the handle. It may be closed by means of a snap or zipper. The bags may also be carried separately.

Having described the embodiments of my invention I claim the following:

1. A device for cleanup of dog litter comprising a handle containing an extendable fork that comprises two prongs that are biased apart by spring tension when withdrawn from the handle to the extended position such as to form a "V" shape, said fork prongs having a nubble at each tip, and there being a nubble at the apex of the "V" shape so that, in the extended position, a bag can be stretchably attached to the nubbles and over the prongs and thereby held in the open position to receive said litter when pushed into the bag.

2. A leash incorporating the device of claim 1 as a handle.

3. A device according to claim 1 further comprising a container attached to the handle for containing a plurality of said bags.

4. A device for cleanup of dog litter comprising a handle containing an extendable fork that comprises two prongs that are biased apart by spring tension when withdrawn from the handle to the extended position such as to form a "V" shape, said fork having a nubble at each tip, and said handle having a nubble positioned near the apex of the fork when it is in the extended position, so that a bag can be stretchably attached to the nubbles or tips and thereby held in the open position to receive said litter when pushed into the bag.

5. A device according to claim 4 wherein the fork is extended or retracted by manually pushing it out of or into the handle.

6. A device according to claim 4 which can be removably attached to a leash to serve as a handle for the leash.

7. A leash incorporating the device of claim 4 as a handle.

8. A device according to claim 4 further comprising a container attached to the handle for containing a plurality of said bags.

9. A method for cleanup of dog litter comprising providing a two-prong fork held in a handle against spring tension that tends to spread the prongs apart, sliding the fork out of the handle so as to spread the prongs apart, stretchably attaching a bag over the prongs of the fork so that the interior opening of the bag lies between the prongs, and the top edges of the bag are folded over the prongs so as to cover the prongs and protect them from the dog litter, and pushing the litter into the bag.

* * * * *